N. M. BROWN.
GEARING FOR ENSILAGE MACHINES.
APPLICATION FILED FEB. 2, 1914.

1,136,650.

Patented Apr. 20, 1915.

Witnesses:

Inventor,
Norton M. Brown,
by Joshua R. H. Potts
his Attorney.

UNITED STATES PATENT OFFICE.

NORTON M. BROWN, OF AURORA, ILLINOIS.

GEARING FOR ENSILAGE-MACHINES.

1,136,650.  Specification of Letters Patent.  Patented Apr. 20, 1915.

Application filed February 2, 1914. Serial No. 815,956.

*To all whom it may concern:*

Be it known that I, NORTON M. BROWN, a citizen of the United States, and a resident of the city of Aurora, county of Kane, and State of Illinois, have invented certain new and useful Improvements in Gearing for Ensilage-Machines, of which the following is a specification.

My invention relates to improvements in gearing for ensilage machines and has for its object the production of gearing operatively connecting the driving shaft of the machine with the feeding elements thereof whereby the rotation of said feeding elements may be reversed, when desired, with ease.

A further object is the production of gearing as mentioned which will be simple and economical and efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1:
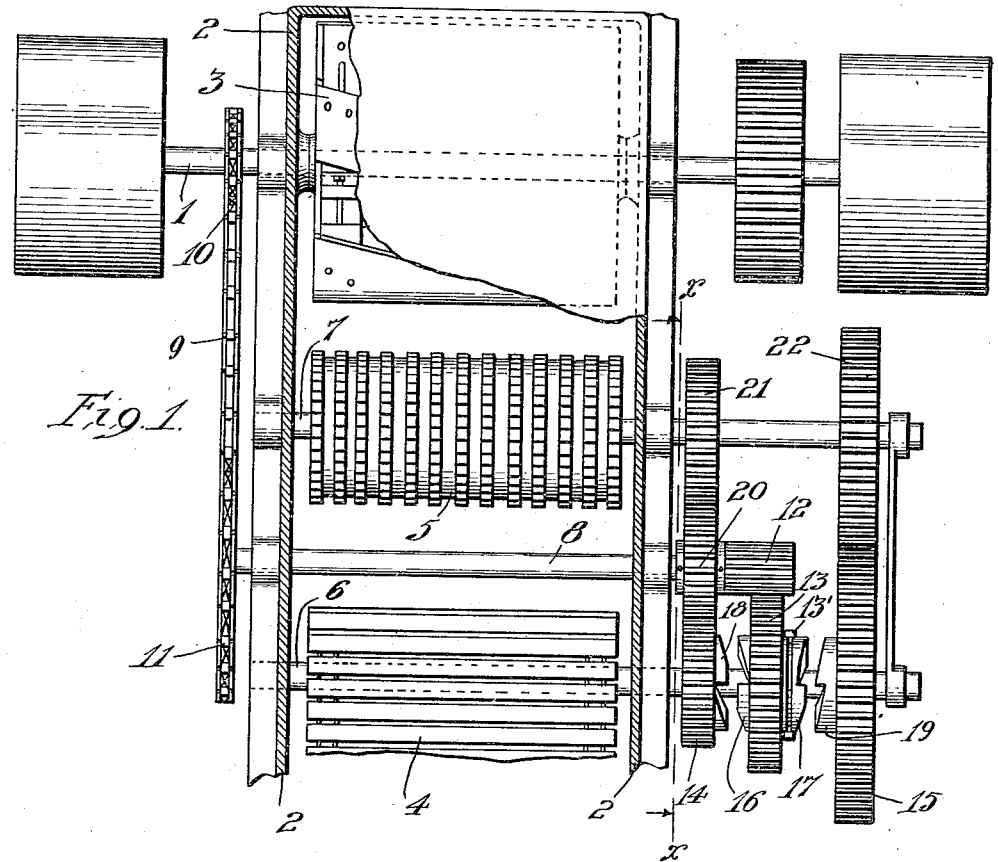
Figure 2:
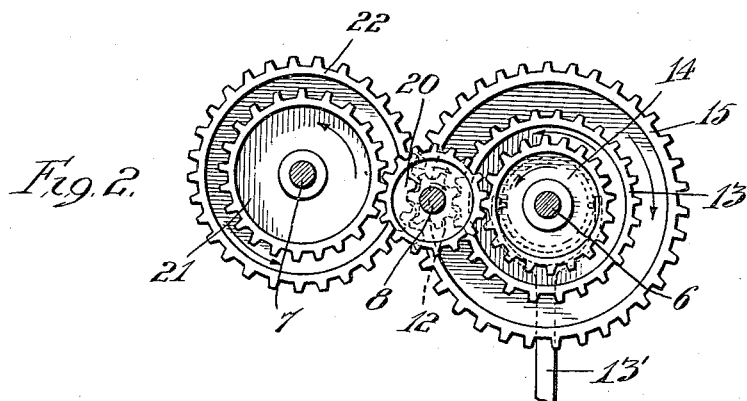

Figure 1 is a fragmentary sectional view of the feeding and cutting mechanism of an ensilage machine equipped with gearing embodying my invention, and Fig. 2 is a section taken on line $x$—$x$ of Fig. 1.

Referring now to the drawing 1 designates the power shaft of the ensilage machine which is mounted in suitable bearings provided in the housing or casing 2 thereof. Arranged in the housing 2 is the cutter head 3 of the machine which is operatively connected for driving by the power shaft 1. The grain or stalks which it is desired to cut are fed to the cutter 3 by means of rotable feeding elements 4 and 5, the former of which is mounted upon a shaft 6 and the latter upon a shaft 7, which shafts are rotatably mounted in suitable bearings provided in the housing 2. Arranged between the shafts 6 and 7 with its respective ends mounted in bearings provided in the sides of housing 2 is a counter-shaft 8 which is operatively connected with the power shaft 1 by means of a sprocket chain 9 which passes around sprocket wheels 10 and 11 provided respectively upon shafts 1 and 8.

Driving of the feeding elements 4 and 5 is obtained through the medium of shaft 8, one end of the latter being provided with a gear 12 which is fixed thereto. Said gear 12 meshes with a gear 13 which is loosely and shiftably mounted upon shaft 6. Arranged at opposite sides of gear 13 upon the shaft 6 are gears 14 and 15, the former being fixed to said shaft 6 and the latter being loosely mounted upon said shaft. The gear 13 is provided at opposite sides with clutch teeth 16 and 17 adapted, upon shifting of said gear, to interlock respectively with clutch teeth 18 and 19 provided upon gears 14 and 15 as clearly shown in Fig. 1. With this arrangement it will be seen that operative connection between gear 13 and either of the gears 14 and 15 may be effected by simply shifting said gear 13 to engage the clutch teeth thereof with the clutch teeth of the gear with which operative connection is desired. A suitable shifting fork 13' coöperates with the gear 13 for effecting the desired shifting thereof as mentioned. The gear 14 is operatively connected through the medium of an idler gear 20 loosely mounted upon the shaft 8 with a gear 21 which is fixed to the shaft 7. The gear 15 meshes with a gear 22 which is also fixed to shaft 7.

In the operation of the machine positive or forward movement of the feeding elements 4 and 5 is effected when gear 13 is in operative connection with the gear 14, such connection being made through interlocking of clutch teeth 16 and 18. The gear 13 being in constant mesh with the gear 12 and being therefore constantly rotated during movement of shaft 8, upon interlocking of clutch teeth 16 and 18, the gear 14 and hence the shaft 6 to which said gear is fixed, will be correspondingly rotated, effecting forward or positive movement of the feeding element 4. The gear 14 being in constant connection through idler gear 20 with the gear 21 which is fixed to shaft 7, said shaft and hence the feeding element 5 will also be positively rotated in this arrangement of the gears. When it is desired to reverse the movement of said feeding elements it is only necessary to shift the gear 13 so as to disengage clutch teeth 16 and 18 and interlock clutch teeth 17 and 19. When this is done the gear 15 will be rotated in unison with the gear 13. Such rotation of said gear 15 will cause rotation of gear 22 which in turn will cause rotation of shaft 7 and hence the feeding element 5, the rotation of the latter in this case being reverse or backward. The gear 21 being fixed to said shaft 7, the reverse rotation of the latter will be imparted through the medium of gears 20 and 14 to the shaft 6 and hence the element 4. Thus with this arrangement it will be seen that forward or reverse movement of the feeding elements of the machine may be secured easily and quickly by simply manipulating the shifting lever 13'. This is of special advantage in the case of emergency where a quick reversal of the movement of the feeding mechanism of the device not infrequently results in the prevention of great damage to the machine or injury to the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In an ensilage machine, the combination of a pair of rotatable driven elements; a rotatable driving shaft; an operative connection between said driving shaft and said driven elements whereby the latter may be driven in either direction, said connection comprising a gear fixed to said driving shaft; a second gear loosely mounted on one of said driven elements and meshing with said first gear; third and fourth gears, one of which is loosely mounted on and the other fixed to said driven element at opposite sides of said second gear; means for operatively connecting said second gear with either said third and fourth gears; and an operative connection between said third and fourth gears and the other of said driven elements whereby, when one of said gears is rotated, said last mentioned element will be rotated in one direction, and when the other of said gears is rotated, said last mentioned element will be rotated in the other direction, substantially as described.

2. In an ensilage machine, the combination of a pair of rotatable driven elements; a rotatable driving shaft; an operative connection between said driving shaft and said driven elements whereby the latter may be driven in either direction, said connection comprising a gear fixed to said driving shaft; a second gear loosely and shiftably mounted on one of said driven elements and meshing with said first gear; third and fourth gears, one of which is loosely mounted on and the other fixed to said driven elements at opposite sides of said second gear; means for operatively connecting said second gear with either said third or fourth gears; and an operative connection between said third and fourth gears and the other of said driven elements whereby, when one of said gears is rotated, said last mentioned element will be rotated in one direction, and when the other of said gears is rotated, said last mentioned element will be rotated in the other direction, substatially as described.

3. In an ensilage machine, the combination of a pair of rotatable driven elements; a rotatable driving shaft; an operative connection between said driving shaft and said driven elements whereby the latter may be driven in either direction, said connection comprising a gear fixed to said driving shaft; a second gear loosely mounted on one of said driven elements and meshing with said first gear; third and fourth gears, one of which is loosely mounted on and the other fixed to said driven element; means for operatively connecting said second gear with either said third or fourth gears; and an operative connection between said third and fourth gears and the other of said driven elements, whereby when one of said gears is rotated, said last mentioned element will be rotated in one direction, and when the other of said gears is rotated, said last mentioned element will be rotated in the other direction, substantially as described.

4. In an ensilage machine, the combination of a pair of rotatable driven elements; a rotatable driving shaft; an operative connection between said driving shaft and said driven elements whereby the latter may be driven in either direction, said connection comprising a gear fixed to said driving shaft; a second gear loosely mounted on one of said driven elements and meshing with said first mentioned gear; third and fourth gears arranged on said last mentioned driven element at opposite sides of said second gear, one of said last mentioned gears being fixed to said driven element and the other being loosely mounted upon said element; clutch teeth on said second, third and fourth gears adapted to interlock with each other whereby, by shifting said second gear, the latter may be operatively connected with either third or fourth gears; and an operative connection between said third and fourth gears and the other of said driven elements whereby, when one of said gears is rotated, said last mentioned element will be rotated in one direction, and when the other of said gears is rotated, said last mentioned element will be rotated in the other direction, substantially as described.

5. In an ensilage machine, the combination of a pair of rotatable driven elements; a rotatable driving element; an operative connection between said driving element and said driven elements whereby the latter may be driven in either direction, said connection comprising a gear fixed to said driving element; a second gear loosely mounted on one of said driven elements and meshing with said first gear; third and fourth gears arranged on said last mentioned driven element, said third gear being fixed to said feeding element and said fourth gear being loosely mounted upon said element; means for operatively connecting said second gear with either said third or fourth gears; fifth and sixth gears fixed to the other of said driven elements; an idler operatively connecting said third gear with said fifth gear; and said sixth gear meshing with said fourth gear, substantially as described.

6. In an ensilage machine, the combination of a pair of rotatable driven elements; a rotatable driving element; an operative connection between said driving element and said driven elements whereby the latter may be driven in either direction, said connection comprising a gear fixed to said driving element; a second gear loosely mounted on one of said driven elements; and meshing with said first gear; third and fourth gears arranged on said last mentioned driven element, said third gear being fixed to said feeding element and said fourth gear being loosely mounted upon said element; means for operatively connecting said second gear with either said third or fourth gears; fifth and sixth gears fixed to the other of said driven elements; an idler gear loosely mounted upon said driving element operatively connecting said third gear with said fifth gear; and said sixth gear meshing with said fourth gear, substantially as described.

7. In an ensilage machine, the combination of a pair of rotatable driven elements; a rotatable driving element; an operative connection between said driving element and said driven elements whereby the latter may be driven in either direction, said connection comprising a gear fixed to said driving element; a second gear loosely and shiftably mounted on one of said driven elements and meshing with said first gear; third and fourth gears arranged on said last mentioned driven element at opposite sides of said second gear, said third gear being fixed to said driven element and said fourth gear being loosely mounted upon said element; means whereby, by shifting said second gear, the latter may be operatively connected with either said third or fourth gears; fifth and sixth gears fixed to the other of said driven elements; an idler gear operatively connecting said third gear with said fifth gear; and said sixth gear meshing with said fourth gear, substantially as described.

In testimony whereof I have signed my name to this specification in the presence of two subscribing witnesses.

NORTON M. BROWN.

Witnesses:
 Joshua R. H. Potts,
 Helen F. Lillis.

Copies of this patent may be obtained for five cents each, by addressing the "Commissioner of Patents, Washington, D. C."